(12) United States Patent
Lawrence et al.

(10) Patent No.: US 12,236,479 B2
(45) Date of Patent: Feb. 25, 2025

(54) DETERMINING ATTRIBUTION FOR AN ELECTRONIC CREDIT APPLICATION

(71) Applicant: Comenity LLC, Columbus, OH (US)

(72) Inventors: Jess Lawrence, Lewis Center, OH (US); Timothy D. Pontious, Gahanna, OH (US); Christina Mosholder, Powell, OH (US); Christian Billman, Gahanna, OH (US); Uchenna Chilaka, Blacklick, OH (US); Celeste Rechner, Upper Arlington, OH (US); Timothy Jones, Westerville, OH (US)

(73) Assignee: BREAD FINANCIAL PAYMENTS, INC., Columbus, OH (US)

( * ) Notice: Subject to any disclaimer, the term of this patent is extended or adjusted under 35 U.S.C. 154(b) by 0 days.

(21) Appl. No.: 16/579,083

(22) Filed: Sep. 23, 2019

(65) Prior Publication Data

US 2020/0098041 A1 Mar. 26, 2020

Related U.S. Application Data

(60) Provisional application No. 62/735,641, filed on Sep. 24, 2018.

(51) Int. Cl.
*G06Q 40/00* (2023.01)
*G06Q 40/03* (2023.01)
(Continued)

(52) U.S. Cl.
CPC ............ *G06Q 40/03* (2023.01); *H04W 4/021* (2013.01); *H04W 4/029* (2018.02)

(58) Field of Classification Search
CPC ............. G06Q 40/025; G06Q 20/4016; G06Q 30/0261
See application file for complete search history.

(56) References Cited

U.S. PATENT DOCUMENTS

| 2004/0230452 | A1* | 11/2004 | Abe | H04M 15/68 705/1.1 |
| 2014/0070001 | A1* | 3/2014 | Sanchez | G06Q 20/321 235/380 |

(Continued)

OTHER PUBLICATIONS

FDIC (Credit Card Activities Manual; Chapter VII.—Underwriting and Loan Approval Process; p. 16, paragraph 2; https://www.fdic.gov/credit-card-activities-manual/chapter-vii-underwriting-and-loan-approval-process; May 24, 2007) (Year: 2007).*

*Primary Examiner* — Elizabeth H Rosen
*Assistant Examiner* — Mark H Gaw

(57) ABSTRACT

A system for determining attribution for an electronic credit application is disclosed. The system receives, via an Internet connection, an electronic credit application for a new credit account, the application includes customer identification information provided by the customer. The system also receives application location information related to the electronic credit application for the new credit account, the application location information obtained from an electronic device, which is not provided by the customer and replaces any application location information provided by the customer. The system additionally receives associate identification information related to the electronic credit application for the new credit account, and associate identification information obtained from sources other than the customer's keyed input. The system determines at least one attribution based on the received information.

16 Claims, 8 Drawing Sheets

(51) Int. Cl.
*H04W 4/021* (2018.01)
*H04W 4/029* (2018.01)

(56) References Cited

U.S. PATENT DOCUMENTS

| | | | |
|---|---|---|---|
| 2014/0316841 A1* | 10/2014 | Kilby | G06F 16/51 705/7.26 |
| 2016/0110707 A1* | 4/2016 | Nack | G06Q 20/3278 705/41 |
| 2016/0267485 A1* | 9/2016 | Walz | G06Q 30/0229 |
| 2016/0267516 A1* | 9/2016 | Walz | G06Q 20/387 |
| 2018/0060954 A1* | 3/2018 | Yin | H04L 63/08 |
| 2018/0121913 A1* | 5/2018 | Unnerstall | G06Q 20/405 |

* cited by examiner

100

400

```
┌─────────────────────────────────────────────────────────┐
│ RECEIVE, VIA AN INTERNET CONNECTION, AN ELECTRONIC      │
│ CREDIT APPLICATION FOR A NEW CREDIT ACCOUNT, THE        │
│ APPLICATION INCLUDING CUSTOMER IDENTIFICATION           │
│ INFORMATION PROVIDED BY A CUSTOMER                      │
│ 410                                                     │
└─────────────────────────────────────────────────────────┘
                              │
                              ▼
┌─────────────────────────────────────────────────────────┐
│ RECEIVE AN APPLICATION LOCATION INFORMATION RELATED     │
│ TO THE ELECTRONIC CREDIT APPLICATION FOR THE NEW        │
│ CREDIT ACCOUNT, THE APPLICATION LOCATION INFORMATION    │
│ OBTAINED FROM AN ELECTRONIC DEVICE, THE APPLICATION     │
│ LOCATION INFORMATION NOT PROVIDED BY THE CUSTOMER       │
│ 420                                                     │
└─────────────────────────────────────────────────────────┘
                              │
                              ▼
┌─────────────────────────────────────────────────────────┐
│ DETERMINE A STORE ATTRIBUTION BASED ON THE              │
│ APPLICATION LOCATION INFORMATION                        │
│ 430                                                     │
└─────────────────────────────────────────────────────────┘
```

```
┌─────────────────────────────────────────────────┐
│ RECEIVE AN ELECTRONIC CREDIT APPLICATION FOR A NEW│
│ CREDIT ACCOUNT, THE APPLICATION INCLUDING CUSTOMER│
│ IDENTIFICATION INFORMATION PROVIDED BY A CUSTOMER,│
│ THE CUSTOMER IDENTIFICATION INFORMATION INCLUDING │
│              A CUSTOMER'S HOME ADDRESS            │
│                        485                        │
└─────────────────────────────────────────────────┘
                         │
                         ▼
┌─────────────────────────────────────────────────┐
│ RECEIVE AN APPLICATION LOCATION INFORMATION RELATED│
│  TO THE ELECTRONIC CREDIT APPLICATION FOR THE NEW │
│  CREDIT ACCOUNT, THE APPLICATION LOCATION INFORMATION│
│   OBTAINED FROM A SOURCE OTHER THAN THE CUSTOMER  │
│                        490                        │
└─────────────────────────────────────────────────┘
                         │
                         ▼
┌─────────────────────────────────────────────────┐
│   DETERMINE A DISTANCE BETWEEN THE APPLICATION   │
│ LOCATION INFORMATION OBTAINED FROM THE SOURCE OTHER│
│  THAN THE CUSTOMER AND THE CUSTOMER'S HOME ADDRESS│
│                        491                        │
└─────────────────────────────────────────────────┘
                         │
                         ▼
┌─────────────────────────────────────────────────┐
│ MAKE A FRAUD RISK DETERMINATION BASED ON A RESULT OF│
│ THE DETERMINED DISTANCE, THE FRAUD RISK DETERMINATION│
│ RESULTING IN A LOWER FRAUD RISK WHEN THE DETERMINED│
│ DISTANCE IS WITHIN A PREDEFINED DISTANCE, AND THE FRAUD│
│   RISK DETERMINATION RESULTING IN A HIGHER FRAUD RISK│
│    WHEN THE DETERMINED DISTANCE IS OUTSIDE THE    │
│                PREDEFINED DISTANCE                │
│                        492                        │
└─────────────────────────────────────────────────┘
                         │
                         ▼
┌─────────────────────────────────────────────────┐
│  UTILIZE THE FRAUD RISK DETERMINATION TO CONTROL AT│
│    LEAST ONE ASPECT OF THE NEW CREDIT ACCOUNT    │
│                        493                        │
└─────────────────────────────────────────────────┘
                         │
                         ▼
┌─────────────────────────────────────────────────┐
│ USE THE APPLICATION LOCATION INFORMATION TO GENERATE│
│                   AN ATTRIBUTION                  │
│                        494                        │
└─────────────────────────────────────────────────┘
```

```
┌─────────────────────────────────────────────────────────────┐
│ IN RESPONSE TO A CUSTOMER SENDING AN ELECTRONIC CREDIT      │
│ APPLICATION: CUSTOMER BIOMETRICS ARE REQUESTED FROM THE     │
│              CUSTOMER'S MOBILE DEVICE                       │
│                          610                                │
└─────────────────────────────────────────────────────────────┘
                              │
                              ▼
┌─────────────────────────────────────────────────────────────┐
│         ACCESSING A PHYSICAL LOCATION OF THE MOBILE DEVICE  │
│                          620                                │
└─────────────────────────────────────────────────────────────┘
                              │
                              ▼
┌─────────────────────────────────────────────────────────────┐
│        ACCESSING A TIME AT WHICH THE BIOMETRICS ARE ACCESSED│
│                          630                                │
└─────────────────────────────────────────────────────────────┘
                              │
                              ▼
┌─────────────────────────────────────────────────────────────┐
│        ACCESSING A DATE AT WHICH THE BIOMETRICS ARE ACCESSED│
│                          640                                │
└─────────────────────────────────────────────────────────────┘
                              │
                              ▼
┌─────────────────────────────────────────────────────────────┐
│  PROVIDING BIOMETRIC SECURITY FOR THE ELECTRONIC CREDIT     │
│  APPLICATION BASED ON THE BIOMETRICS OF THE CUSTOMER, THE   │
│      COORDINATES OF THE PHYSICAL LOCATION OF THE            │
│ CUSTOMER'SMOBILE DEVICE, THE TIME AT WHICH THE BIOMETRICS   │
│   ARE ACCESSED, AND THE DATE AT WHICH THE BIOMETRICS ARE    │
│                         ACCESSED                            │
│                           650                               │
└─────────────────────────────────────────────────────────────┘
```

FIG. 6

DETERMINING ATTRIBUTION FOR AN ELECTRONIC CREDIT APPLICATION

CROSS-REFERENCE TO RELATED APPLICATIONS (PROVISIONAL)

This application claims priority to and benefit of U.S. Provisional Patent Application No. 62/735,641 filed on Sep. 24, 2018, entitled "DETERMINING ATTRIBUTION FOR AN ELECTRONIC CREDIT APPLICATION" by Jess Lawrence et al., and assigned to the assignee of the present application, the disclosure of which is hereby incorporated herein by reference in its entirety.

BACKGROUND

Prior to the utilization of the electronic credit account application process using the Internet or other computer network, a customer would utilize a paper application for the credit application process. The customer would fill out the application and then mail it to the credit account issuer. Using a paper application provided the credit account issuer with an inherent method by which to track the credit account application from inception to decisioning. For example, the paper application would include identification that would indicate that it was obtained by a customer at a specific store (through the mail, etc.). As such, it was easy for the store to be identified and receive the proper attribution. For example, the store could stamp (or otherwise indicate the specific store to receive attribution) on the actual application itself.

It was also possible for the associate that provided the credit account application paperwork to be identified on the actual paperwork. For example, an associate could put their identifier on the actual application (or attach a business card, etc.). However, this process is not compatible with the electronic credit application. In contrast, an electronic credit application can be found on a website, a mobile application, a poster in the store, etc.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 4A is a flow diagram to perform attribution, in accordance with an embodiment.

FIG. 4C is a flow diagram to make a fraud risk determination along with the attribution determination, in accordance with an embodiment.

FIG. 6 is a process flow diagram for providing biometric security from a mobile device for a received electronic credit application, in accordance with an embodiment.

DESCRIPTION OF EMBODIMENTS

Figure 1:
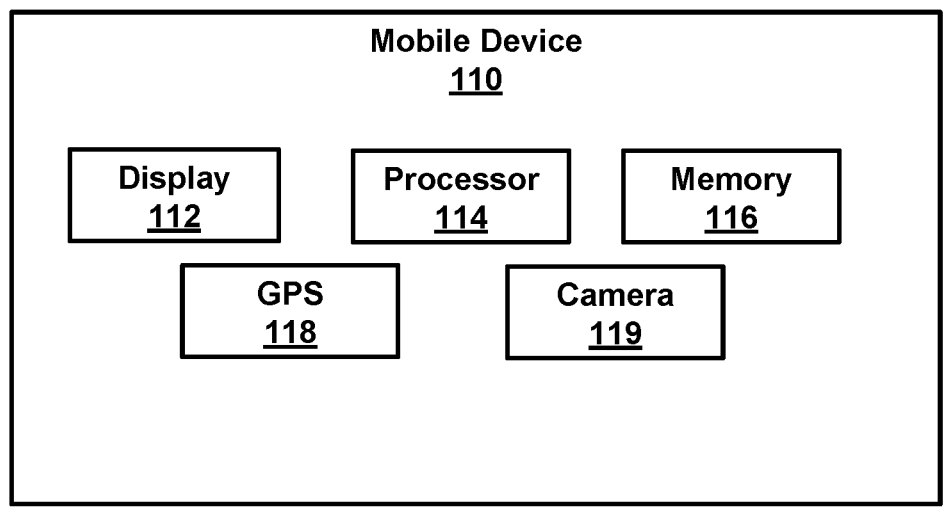
FIG. 1 is a block diagram of a mobile device, in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "deciding", "determining", "interacting", "searching", "pinging" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

It should be appreciated that the obtaining or accessing of information conforms to applicable laws, including privacy laws (e.g., federal privacy laws, state privacy laws, etc.).

In the following discussion, the term "retailer" is used to define a company or conglomeration that includes one or more brands. The term "brand" refers to a specific section of the retailer that includes a number of stores. The term "store" refers to a single sales location, a store could be a physical store (e.g., brick and mortar) or it could be a virtual store (e.g., a location that is accessed via the web). For example, retailer Spelunk could include the three brands: outdoor life, indoor charm, and cavern's r us. Each of the brands could have one or multiple locations, e.g., the brand cavern's r us could include a number of stores, e.g., store 1 in Chicago, store 2 in Nashville, store x in New Zealand, and virtual store y located at www.cavernsrus.com.

Overview

Attribution to a specific store for a given brand is important for a number of reasons. A brand could require that each store generate "x" new credit account holders over a given time period. Each store that meets or surpasses the goal would be rewarded by the brand with activities such as receiving a bonus, payout, raise, promotion, etc. In contrast, any store that misses the goal may be subject to a penalty or remediation plan that could include a loss of a bonus, a loss of a payout, management review, store management training, demotion, or replacement, associate training, store default on a contract, etc. As such, the attribution to a store can be important for the store, the store management, etc.

In one embodiment, the brand could require that each store generate the same number of new credit account holders. In another embodiment, different stores could have different quotas for new credit account holder generation. For example, the quotas could be based on the store's prior new credit accountholder generating history, the location of the store, an incremental (or percentage) increase in new credit account applications since the last year, or the like. Moreover, the quotas and/or attribution could be based on new applications received, new applications that result in a credit account offer to a customer, new applications that result in new customer accounts, a combination thereof, or the like.

Similarly, associate attribution can cause an associate to be rewarded or penalized. For example, in an associate attribution scenario, it may be the associate working the register that receives attribution for the new customer application even if it was a floor worker that provided the information, guided the customer through the application process, provided the customer with the application, etc. As such, the associate working the register would receive the bonus while the floor worker is penalized or does not receive the reward even though they were the actual driving force behind the new customer acquisition.

Importantly, the embodiments of the present invention, as will be described below, provide an approach for determining attribution for an electronic credit application which differs significantly from the conventional processes used to determine attribution for a credit application. In conventional approaches, the application was either a piece of paper that was filled out and mailed in, or it was an electronic application at the point-of-sale (POS). As such, it was easy for the store and even the associate that provided the credit account application paperwork to be identified on the actual paperwork or use a POS identifier (e.g., a MAC address or the like) as part of the application. For example, the store could stamp (or otherwise indicate the specific store to receive attribution) on the actual application itself. Similarly, an associate could put their identifier on the actual application (attach a business card, etc.). However, the conventional approach is not compatible with an Internet-centric electronic credit application. In contrast, an Internet-centric electronic credit application can be obtained from a URL (or the like) on a poster in a store, from a website, via a mobile application, and the like. Moreover, the Internet-centric electronic credit application can be filed from a mobile device, from a web page, from a home or work computer, etc.

Since the electronic credit application can now be completed and submitted to the credit account provider by the customer using the Internet, the pre-Internet ability to track attribution for a credit application cannot be simply adjusted to use on a computing device or handled over a network. Instead, the use of electronic credit account applications requires a completely new and different system than that which was used prior to electronic applications. Moreover, establishing attribution for Internet, mobile device, application, and/or web-based credit account applications is different than even the electronic credit account application that is performed by the store at the POS. For example, the POS filed application would include the POS identifier. As such, store and even associate attribution could be automatically obtained by the register or sales device. However, when the credit account application is performed by a customer without needing a POS or the US Postal Service, a new and different attribution problem that is completely network-centric occurs.

For example, reliance on the customer to input the appropriate attribution, e.g., store code, associate identification, or the like, is error prone, tedious, time-consuming, and often fails to yield accurate information about the store and/or associate that should receive the attribution for the credit. However, the present embodiments, as will be described and explained below in detail, provide a previously unknown and Internet-centric procedure for obtaining and utilizing location data that is not provided by a customer but instead by one or more of a plurality of electronic devices that are in network-communication with the customer's mobile device to provide a consistently accurate and repeatable determination of store location and an appropriate attribution.

Thus, embodiments of the present invention provide a capability to provide store attribution and even associate attribution which is completely different than the prior conventional process used to determine attribution because of the Internet-centric aspect of the application which allows the application to be accessed on the web, completed on the web and presented to the credit account provider via the web. As such, the prior conventional process used to determine attribution cannot be used to identify attribution for the electronic credit application discussed herein.

As will be described in detail, the various embodiments of the present invention do not merely implement conventional attribution processes on a computer. Instead, the various embodiments of the present invention, in part, provide a previously unknown, unavailable, and unnecessary procedure for including location information obtained from at least one electronic device with the transmitted electronic credit application. In so doing, embodiments provide a consistently accurate and repeatable process for determining the store that should receive attribution for the electronic credit application. Hence, embodiments of the present invention provide a novel process for determining attribution for an electronic credit application which is necessarily rooted in Internet-centric computer technology to overcome a problem specifically arising in the realm of Internet-based electronic credit application.

Moreover, the embodiments do not recite a mathematical algorithm; nor do they recite a fundamental economic or longstanding commercial practice. Instead, they address a business challenge associated with determining attribution in an Internet-centric environment. Thus, the embodiments do not "merely recite the performance of some business practice known from the pre-Internet world along with the requirement to perform it on the Internet." Instead, the embodiments are necessarily rooted in network-centric environments in order to overcome a problem specifically arising in the realm of store and possibly associate attribution.

Operation

Referring now to FIG. 1, a block diagram of a mobile device 110 is shown. Although a number of components are shown as part of mobile device 110, it should be appreciated that other, different, more, or fewer components may be found on mobile device 110.

In general, mobile device 110 is an example of a customer's mobile device, a store's mobile device, an associate's mobile device, or the like. Mobile device 110 could be a mobile phone, a smart phone, a tablet, a smart watch, a piece of smart jewelry, smart glasses, or other user portable devices having wireless connectivity. For example, mobile device 110 would be capable of broadcasting and receiving via at least one network, such as, but not limited to, WiFi, Cellular, Bluetooth, NFC, and the like. In one embodiment, mobile device 110 includes a display 112, a processor 114, a memory 116, a GPS 118, a camera 119, and the like. In one embodiment, instead of providing GPS information, the location of mobile device 110 may be determined within a given radius, such as the broadcast range of an identified beacon, a WiFi hotspot, overlapped area covered by a plurality of mobile telephone signal providers, or the like.

Figure 2:
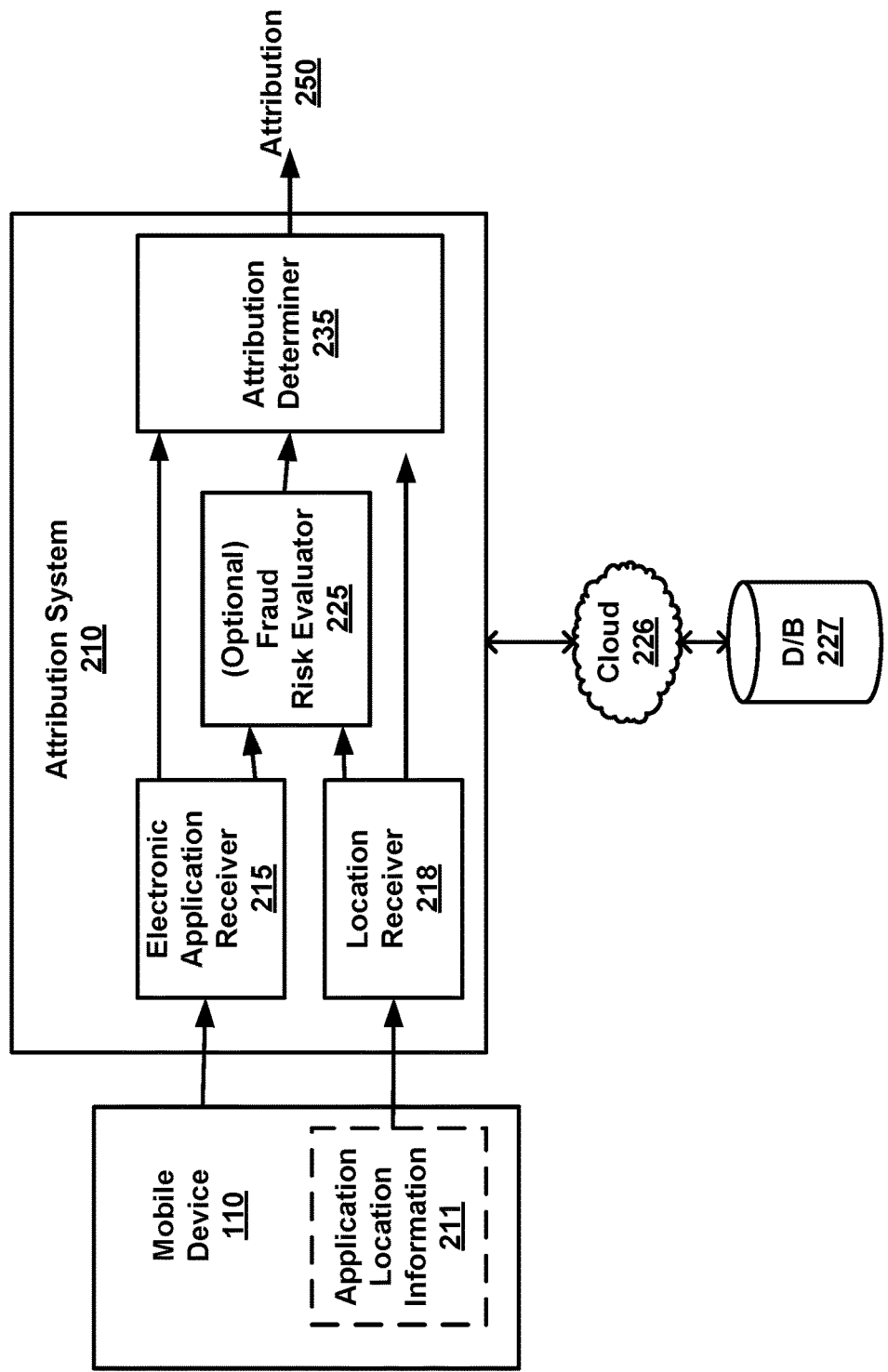
FIG. 2 is a block diagram of a system for performing attribution, in accordance with an embodiment.

With reference now to FIG. 2, a block diagram of a system 200 for ascertaining attribution is shown in accordance with an embodiment. FIG. 2 includes mobile device 110, attribution system 210, cloud 226, and database 227.

In one embodiment, mobile device 110 optionally includes application location information 211. For example, the application location information 211 could be obtained from GPS 118 of mobile device 110. In another embodiment, application location information 211 could be obtained by a device separate from mobile device 110. For example, application location information 211 could be obtained by systems such as, but not limited to, a geo-fence, a node (e.g., a beacon, WiFi node, an RFID node, a mobile phone provider node), an address, a lat-long, or the like.

In one embodiment, application location information 211 that is obtained outside of the customer's mobile device is provided to mobile device 110 such that it can be transmitted to attribution system 210 along with (in conjunction with, appended to, provided within, etc.) the electronic credit application. In one embodiment, application location information 211 that is obtained outside of the customer's mobile device is transmitted directly to location receiver 218 of attribution system 210. In one embodiment, if the application location information 211 is received separately, it will be tied to the electronic credit application via a common identifier, such as, but not limited to, a customer number, a customer's mobile device ID, or the like. As such, if the electronic credit application and the application location information 211 are received separately, they can be correlated at attribution system 210 by the common identifier.

For example, an area of interest can be monitored such that it can be determined if a mobile device 110 enters into the area of interest. This determination may be made by, but is not limited to: a pinging of mobile device 110, a push or pull interaction with a beacon, a location broadcast from mobile device 110, a location broadcast from an app, such as a store's application, operating on mobile device 110, mobile device 110 entering into a geo-fenced area, a connection to a WiFi network, and the like. Moreover, the location determination may be an actual location or a relative location. For example, if mobile device 110 is equipped with a GPS, the location information may be specific latitude and longitude. In contrast, if a beacon in the retail store is used, then the location of mobile device 110 would be somewhere within the broadcast range of the beacon. Similarly, the location could be determined as being within a geo-fenced area, or the like.

Figure 5:
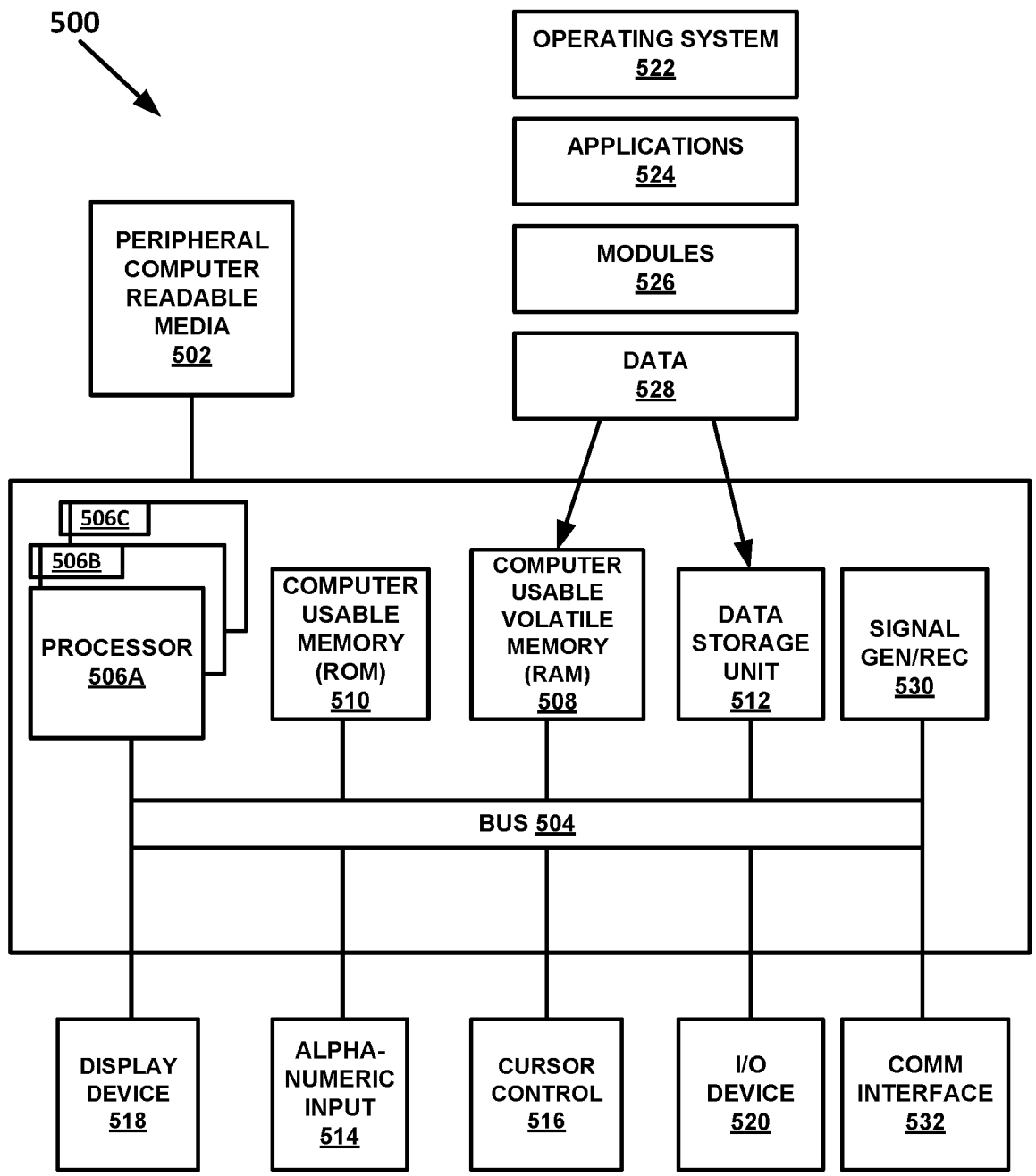
FIG. 5 is a block diagram of an example computer system with which or upon which various embodiments of the present invention may be implemented.

In one embodiment, attribution system 210 is a computing system such as computer system 500 described in detail in the FIG. 5 discussion herein. In one embodiment, attribution system 210 includes an electronic application receiver 215, a location receiver 218, and an attribution determiner 135. In one embodiment, attribution system 210 also includes the optional fraud risk evaluator 225.

In one embodiment, attribution system 210 receives an electronic credit application for a new credit account at electronic application receiver 215 from mobile device 110 (e.g., via the cloud 226, or the like). In another embodiment, attribution system 210 receives the electronic credit application for a new credit account at electronic application receiver 215 from a web site that has been accessed by mobile device 110 (e.g., via the cloud 226, or the like).

In one embodiment, attribution system 210 receives application location information 211 related to the electronic credit application for the new credit account at location receiver 218 from mobile device 110 (e.g., via the cloud 226, or the like). In another embodiment, attribution system 210 receives the application location information 211 at location receiver 215 from a web site that has been accessed by mobile device 110 (e.g., via the cloud 226, or the like).

In one embodiment attribution determiner 235 accesses database 227 via cloud 226 and utilizes the received application location information 211 to ascertain the store and/or associate that should receive the attribution for the electronic credit application for the new credit account.

An example of cloud 226 is a network such as the Internet, local area network (LAN), wide area network (WAN), or the like. Database 227 may include store specific data, brand specific data, retailer specific data, a shared database, a conglomerate database, a portion of a larger storage database, and the like. Moreover, database 227 could be a local database, a virtual database, a cloud database, a plurality of databases, or a combination thereof.

Figure 3:
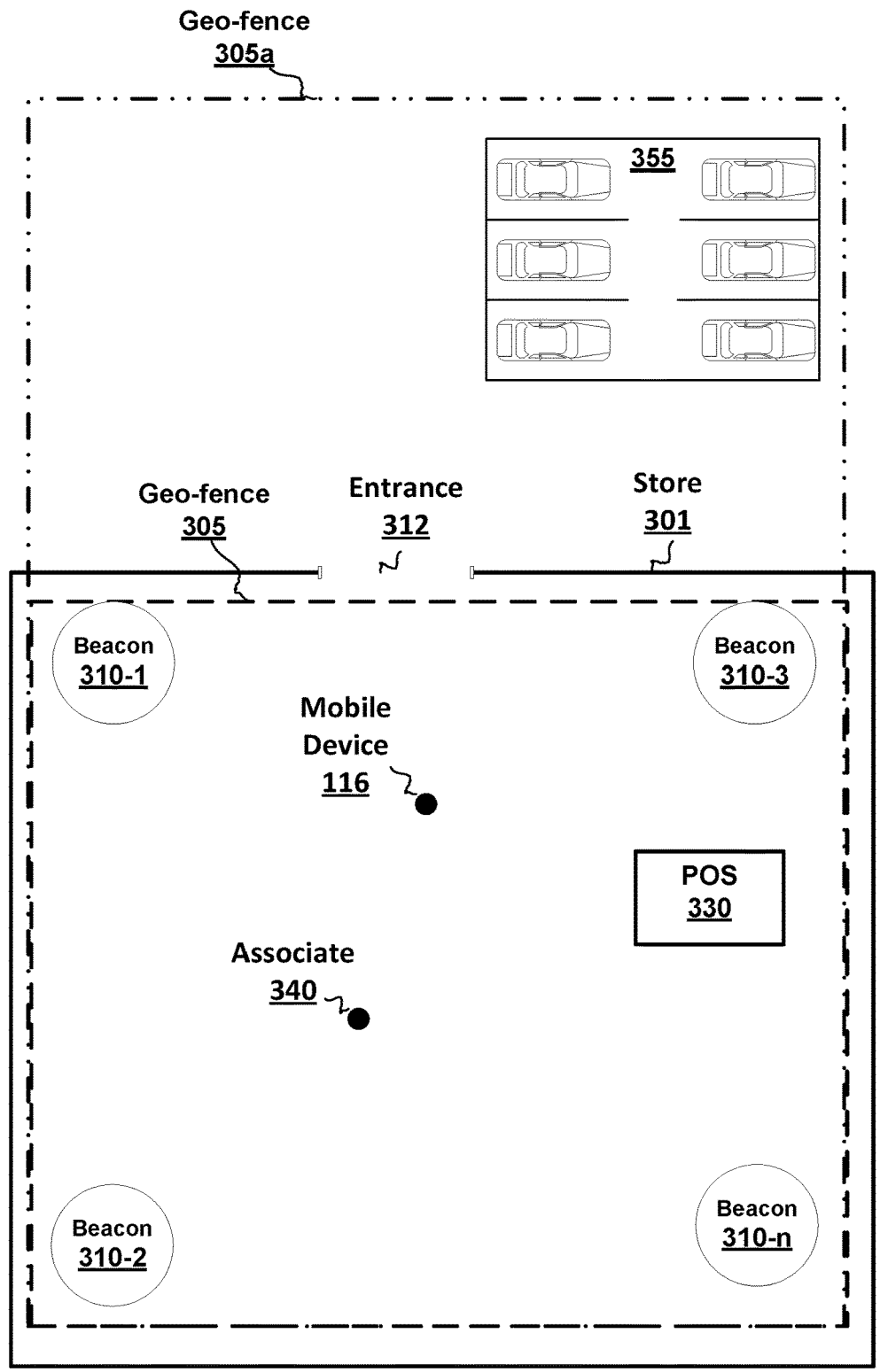
FIG. 3 is a block diagram of an embodiment of a retail establishment having one or more location identifying electronic capabilities in accordance with an embodiment.

Referring now to FIG. 3, a top plan view 300 of a store 301 is shown in accordance with an embodiment. In general, store 301 is any physical brick and mortar store that provides goods for sale at the store location. In one embodiment, store 301 includes an entrance 312. In addition, in different embodiments and configurations, store 301 can include one or more of, geo-fence 305, geo-fence 305a, beacons 310-1 through 310-n, POS 330, and exterior space such as a parking lot 355.

For purposes of the discussion, geo-fence 305 and geo-fence 305a refer to a virtual perimeter defining a real-world geographic area. Moreover, geo-fence 305 and geo-fence 305a can be created by various means that could be completely virtual or use physical components. One example of physical components to create a geo-fence 305 includes the use of beacons. For example, in FIG. 3, geo-fence 305 is a rectangle created by the physical locations of beacons 310-1, 310-2, 310-3, and 310-n that includes the area at a boundary about store 301. In contrast, geo-fence 305a includes the area at a boundary about store 301, a parking lot 355 another part of a mall in which the store is located, and the like. It should be appreciated that geo-fence 305 and geo-fence 305a can be a number of different sizes and shapes.

Further, the one or more of beacons 310-1 through 310-n are devices configured to be communicatively coupled with mobile device 110, such as via near field communication (NFC), Bluetooth, WiFi, or the like. In one embodiment, one or more of beacons 310-1 through 310-n is an iBeacon™, which is an indoor positioning system from Apple Inc. For example, the iBeacon is a low-powered, low-cost transmitter that can notify nearby iOS and/or Android devices of their presence. Although a specific example is provided, the beacons are not limited to only that brand. Different beacons from other companies would also be acceptable.

FIG. 4A is a flow diagram utilized by a system for performing attribution, in accordance with an embodiment.

Referring now to 410 of FIG. 4A and to FIG. 3, one embodiment receives, via an Internet connection, an electronic credit application for a new credit account, the application including customer identification information provided by a customer.

With reference now to 420 of FIG. 4A and to FIG. 2, one embodiment receives an application location information 211 related to the electronic credit application for the new credit account, the application location information 211 obtained from an electronic device, the application location information 211 not provided by the customer. In one embodiment, the application location information 211 replaces any application location information provided by the customer.

The application location information 211 could identify a location where the electronic credit application for the new credit account was transmitted to the server, a location where the electronic credit application for the new credit account was initially accessed by the customer, identify a location where the electronic credit application for the new credit account was received by the customer, or the like.

In one embodiment, the application location information 211 is automatically included with the application and is provided without customer input/modification/adjustment. In another embodiment, the application location information 211 is provided from an electronic device other than the customer's mobile device and includes and identifier that will link the application location information 211 with the electronic credit application at attribution system 210 of FIG. 2.

As discussed herein, application location information 211 can be provided by the mobile device or can be determined by a location determiner via geo-fence, beacon range, beacon ID, a ping, NFC, WiFi, MAC address from a device, or the like. Moreover, the application location information 211 may be an actual location or a relative location.

Actual location information may be obtained by the user's mobile device location services, such as but not limited to, GPS, WiFi, cellular service, beacon derived location determination and the like. Moreover, the location determined by the mobile device location service may be useful even at differing levels of accuracy. For example, a GPS enabled mobile device 110 can provide location information that is accurate to within a few meters while a cellular service, beacon or WiFi location capabilities of mobile device 110 can provide a location radius or location area. For example, the mobile device 110 being located within range of a beacon, within the overlapping area of a number of cellular service towers, etc.

In contrast, relative location information can be determined via a beacon such as one or more of beacons 310-1 through 310-n. For example, although the actual location of mobile device 110 may not be known, if mobile device 110 were interacting with beacon 310-1, then the relative location of mobile device 110 would have to be near, or in range of, beacon 310-1 broadcast capabilities. Similarly, a geo-fence could be used to determine that mobile device 110 is within the geo-fenced area.

In general, one or more of the options may be used to provide application location information 211. Although an order may occur based on the accuracy of the application location information 211 provider, the order is exemplary. It should be appreciated that changes in technology and/or technological availability can make any of the technologies discussed herein more or less accurate than any other of these or similar technologies.

With reference now to 430 of FIG. 4A and to FIG. 2, one embodiment determines a store attribution based on the application location information 211.

For example, in one embodiment, attribution system 210 will receive a location from a location capability of a customer's mobile device (e.g., GPS, map application, etc.). Attribution system 210 will also obtain a brand identifier from the electronic credit application for the new credit account. Attribution system 210 will access database 227 that contains a plurality of store locations for the brand. Attribution system 210 will use the received location to identify a specific store from the plurality of store locations and provide the store attribution to the specific store.

In one embodiment, attribution system 210 will receive a location from a location capability of a customer's mobile device (e.g., GPS, map application, etc.). Attribution system 210 will access database 227 that contains a plurality of geofenced areas, each of the plurality of geofenced areas including associated data. Attribution system 210 will utilize the location to identify a specific geofenced area from the plurality of geofenced areas in the database 227 and obtain the associated data for the specific geofenced area. Attribution system 210 will further utilize a brand identifier associated with the electronic credit application for the new credit account in conjunction with the associated data for the specific geofenced area to determine a specific store to receive the store attribution.

In one embodiment, attribution system 210 will receive a receive a node identifier from a customer's mobile device, the node identifier identifying a specific node. Attribution system 210 will also obtain a brand identifier from the electronic credit application for the new credit account. Attribution system 210 will access database 227 that contains a plurality of node identifiers, each of the plurality of node identifiers including associated data. Attribution system 210 will utilize the brand identifier in conjunction with the node identifier to obtain the associated data for the specific node. Attribution system 210 will determine a specific store to receive the store attribution based on the obtained associated data for the specific node.

In one embodiment, mobile device 110 (or an application operating thereon) will be enabled to look for the transmission of one or more of beacons 310-1 through 310-n. When mobile device 110 is within physical proximity to the beacon and detects it, the application can obtain location information or beacon identification information. In one embodiment, the node MAC address (device IP address, etc.) is automatically included as part of the information provided by mobile device 110.

In one embodiment, the application location information 211 could be the customer's home or work address. Moreover, the use of the home or work address could be based on the time of day the application location information 211 was received. For example, if the electronic credit application is received (or obtained) during working hours, the application location information 211 would be the customer's work address. In contrast, if electronic credit application is received (or obtained) after hours or on the weekend, the application location information 211 would be the customer's home address.

In another example, a cellular network could be used to provide the application location information 211. E.g., the customer's mobile device was within range of cell tower A31D6, and cell tower A31D6 has a ½ mile range. Then the ½ mile radius of cell tower A31D6 would be the application location information 211.

Once the application location information 211 is established, the store attribution would be obtained using the location similar to the examples described herein.

In another example, the application location information 211 may be obtained when the new credit account is used at the store. This would be an example of an ability to post designate the store attribution.

Associate Attribution

Figure 4B:
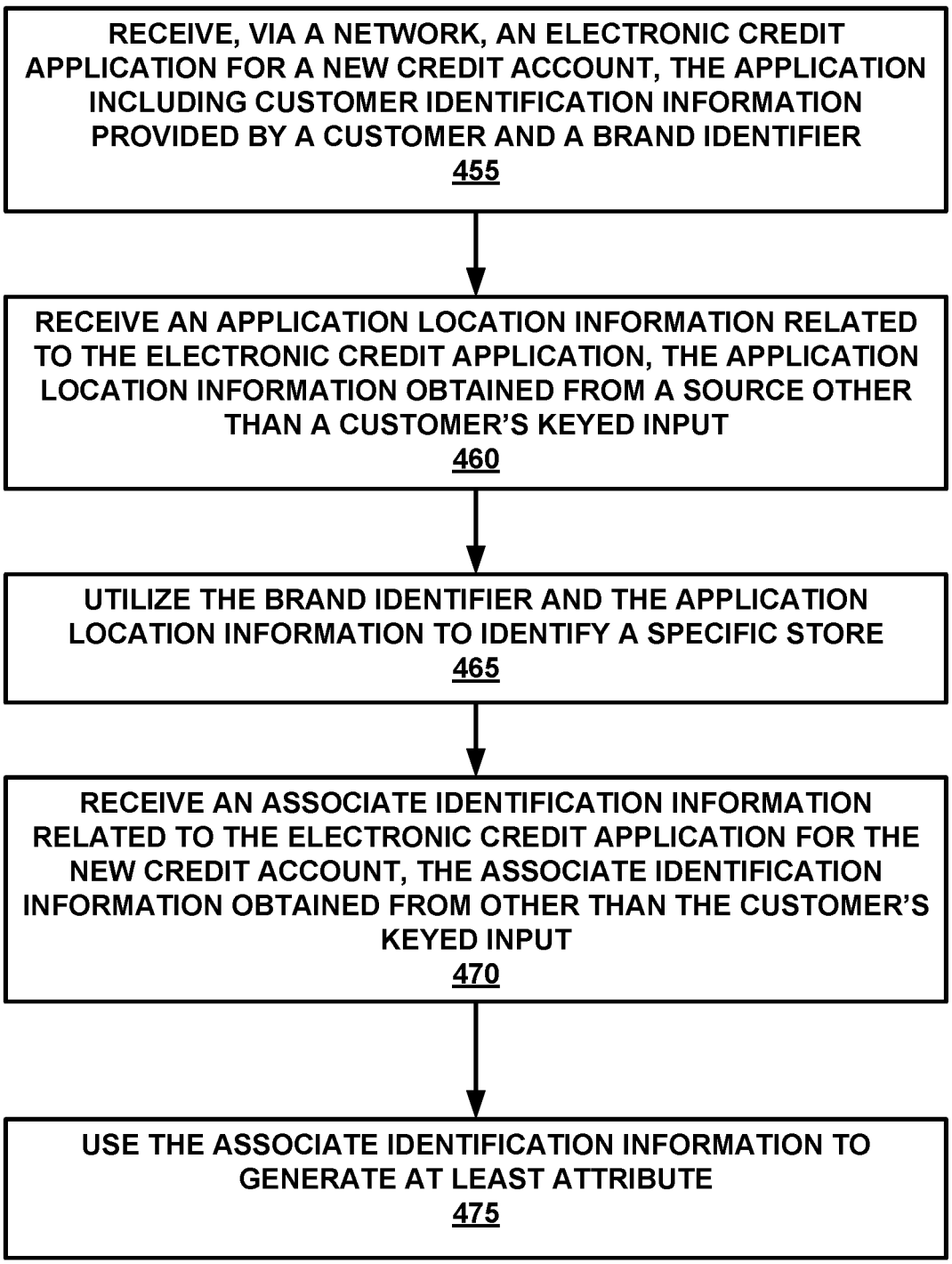
FIG. 4B is a flow diagram to perform additional attribution, in accordance with an embodiment.

FIG. 4B is a flow diagram 450 of an associate attribution determination in accordance with an embodiment. Similar to the store attribution, associate attribution can cause an associate to be similarly rewarded or penalized. For example, in an associate attribution scenario, it may be the associate working the register that receives attribution for the new customer application even if it was a floor worker that provided the information, guided the customer through the application process, provided the customer with the application, etc. As such, the associate working the register would receive the bonus while the floor worker is penalized or does not receive the reward even though they were the actual driving force behind the new customer acquisition.

Again, attribution to a specific associate is important for a number of reasons. A store could require that each associate generate "x" new card holders over a given time period. Meeting or surpassing the goal would result in the associate being rewarded, receiving a bonus, etc. In contrast, missing the goal could result in a loss of bonus, payouts, raise, training, replacement, etc. As such, the attribution to the associate can be important for the associate, the store, the store management, etc.

Moreover, brands like to identify the appropriate store and the appropriate associate that drives a successful customer credit application. The identification can be important for leaderboards, associate rewards, associate incentives, bonuses, recognition, etc. The need for such a solution is even more apparent for big ticket purchases (for example furniture retailers, jewelry retailers, and potentially automotive retailers) where associate attribution is of particular significance and such attribution can be overlooked or misapplied.

For example, the ability to correlate the identity of the specific store or the associate with the customer credit application is difficult or even impossible if the customer applies for the credit account at a location other than a POS, such as when the customer applies via the customer's own mobile device. The attribution information could be missing completely or could include misleading information such as the misidentification of an associate, or the like.

With reference now to 455 of FIG. 4B, one embodiment receives an electronic credit application for a new credit account, the application including customer identification information provided by a customer and a brand identifier.

Referring now to 460 of FIG. 4B, one embodiment receives an application location information 211 related to the electronic credit application, the application location information 211 obtained from a source other than a customer's keyed input.

With reference now to 465 of FIG. 4B, one embodiment utilizes the brand identifier and the application location information 211, to identify a specific store. In one embodiment, the identification of the store is used to generate an attribution for the store such as described in 430 of FIG. 4A.

Referring now to 470 of FIG. 4B, one embodiment receives an associate identification information related to the electronic credit application for the new credit account, the associate identification information obtained from other than the customer's keyed input.

In one embodiment, the associate identification information is received at attribution system 210 (of FIG. 2) as an attachment to the electronic credit application for the new credit account. In one embodiment, the associate identification information is processed at a back end separate from a processing of the electronic credit application for the new credit account.

In general, there are a number of different associate identification methods that are available to obtain associate level attribution. The associate identification could include interactive methods such as: the customer could be prompted during the application process to obtain an associate's ID number, the customer application process could include a question such as an evaluation or satisfaction score that would cause the applying customer to put in the associate information, etc.

In another embodiment, the associate attribution would not be part of the application process but would be attached to the application and then processed or tracked at a back end. For example, the application is received with the photo (or other associate identifier) attached and the photo is processed at back end to provide attribution to the associate for the application.

In one embodiment, the application process could include the customer scanning a badge (or similar) of the assisting associate (e.g., take a picture of badge, take a picture of associate, etc.). For example, if the associate identification information is an image provided by a customer's mobile device. The image could be, but is not limited to, an image of an associate, an image of an associate's badge, an image of an associate's identification number, and an image of an associate's name. After the associate identifier is received, attribution system 210 will access database 227 that contains associate identifiers for each associate of the specific store. Attribution system 210 will use the image captured by the camera of the mobile device to run a facial recognition or other image analysis to identify a specific associate from the database 227 and provide the attribution to the specific associate.

In another embodiment, an associate identification could be based on device-to-device communication between the customer's mobile device and the store's electronic device. The store's electronic devices include, but are not limited to, one or more of: a WiFi node, a beacon, an RFID node, a store's mobile device, a POS computing device, an associate's mobile device, and the like. For example, a customer's mobile device will receive an associate identifier provided via a beacon (e.g., NFC, WiFi, or the like) from an associate's device, a store's mobile device, a store's POS computing device, an RFID, Bluetooth, or similar in an associate's name tag, badge, button, etc.

In one embodiment, the device-to-device communication between the customer's mobile device and the store's electronic device can include, for example, a data exchange, a hotspot interaction with one or more of the store's electronic device(s), or the like. The data exchange could be as little as an associate identifier or as much as the entire credit application provided from the associate's mobile device to the customer's mobile device. In the latter, the providing of the entire credit application from the associate's mobile device to the customer's mobile device would provide the associate attribution and would also reduce at least one step in the customer application process.

In one embodiment, the device-to-device communication triggers a process to initiate the electronic credit application for the new credit account on the customer's mobile device. Where the trigger could be a web URL push to the electronic credit application for the new credit account, a queuing up of the electronic credit application for the new credit account on a display of the customer's mobile device, an app upload of the electronic credit application for the new credit account, and the like. In one embodiment, the trigger interfaces with a cache or a memory store on the customer's mobile device to obtain at least a portion of the customer identification information and prefills at least a portion of the electronic credit application for the new credit account with such customer identification information.

For example, using a device bump, when a customer wants to apply for the credit account, the associate's mobile device is configured to send a signal to the customer's mobile device that will trigger the credit application process on the customer's mobile device. In other words, the associate's mobile device will push a web URL over NFC (Bluetooth, WiFi triggering link, or the like) to the customer's mobile device when a customer taps the associate's mobile device with the customer's mobile device. In one embodiment, the device bump NFC will trigger the customer's mobile device to queue up the credit application, upload an app, or the like. In one embodiment, the queuing up of the credit application will also interact with the cache or other store memory on the customer's mobile device to obtain customer information and prefill the credit application.

In another embodiment, some or all of the customer information can be obtained and prefilled in the credit application using customer look-up methods and customer data acquisition from other databases, such as those described in the U.S. patent applications Ser. Nos. 14/947, 803 and 15/244,401, which are incorporated by reference in their entirety herein.

In another embodiment, attribution system 210 will access database 227, which contains associate identifiers for each associate of the specific store, and provide such applicable associate identifiers to the customer's mobile device. Attribution system 210 will receive an identification of one or more associates from the customer's mobile device and provide the attribution to the one or more associates.

For example, the application could receive identifying information for associates that are employed at the store. The identifying information could then be presented a portion of the mobile or internet-based credit application that asks for an identity of the associate that assisted the customer. The identification could be a drop-down menu (or the like) that includes a picture and/or name of the associates that work at the store. The customer could then select the associate that helped them from the provided list of associates.

In one embodiment, instead of providing all of the associate identifiers, attribution system 210 will access a list of associates at the specific store at the time the electronic credit application for a new credit account was received, access database 227 that contains associate identifiers for each associate of the specific store, and provide only the associate identifiers for each of the associates on the list to the customer's mobile device.

For example, the associates would be registered as working and the application could receive from the store the identifying information for only associates that are presently working. Then, when the mobile or internet-based credit application asks for the identity of the associate that assisted the customer, the identification could be a drop-down menu (or the like) that includes a picture and/or name of the associates that are presently at the store. The customer could then select the associate that helped them from the provided options.

In one embodiment, the associates that are actually working when the application is filed could be obtained from a fixed input, such as a weekly assignment provided by the store that identifies the associates that are on the schedule. In another embodiment, the information could be obtained from a real-time or near real-time store input that could be based on the actual associates that are clocked in, badged in, or the like. Moreover, if the associates have badges/mobile devices/RFID tags or the like, those devices could be used by in-store readers, WiFi nodes, and the like to provide a timely list of the actual associates that are at the store at the time of application.

By utilizing the drop-down menu of associates, the customer may feel less anxiety than having to take a picture of the associate, or the associate's badge, or asking the associate for a name, ID, phone number, etc. Similarly, the associate would likely not feel as comfortable having each customer take their photo, etc.

With reference now to 475 of FIG. 4B, one embodiment uses the associate identification information to generate at least one attribution. In one embodiment, there may be the opportunity for the customer to input one or more additional associate's identification as part of the attribution. For example, if two associates worked together to help the customer, or one associate assisted the customer and then handed the customer off to another associate for the purchase, etc., the inputs required by the customer could allow for a splitting of the attribution, an assignment of attribution by percentage to each associate, etc. In so doing, the store would be able to identify associates that work well together, or that are often identified as working in tandem such that the total attributions of both associates are used to reach the required application count.

For example, if Jack and Jill are sometimes designated by customers as part of a joint attribution, or Jack and Jill often work at the same times, and Jill has reached and/or surpassed her application quota (and even the daily/weekly/monthly store quota), but Jack has not, it may be determined that Jack and Jill could be evaluated both separately and jointly. That is, the shortcomings of Jack could be determined to be based on customer's attributing Jack's initial help to only the final application process being overseen by Jill, or the like. As such, the store could determine that Jill and Jack working together is a great associate combination for meeting or exceeding their customer credit application quota.

In addition to providing associate level attribution to the credit application, the above listing of store associates and their identifying information could also be used as part of an application or the like to request customer feedback. For example, the customer could be polled while leaving the store (or after leaving the store), via an app, email, etc. to ascertain if there was an associate that deserved positive feedback, if there was an associate that the customer was disappointed with, if there was an interaction that could have occurred to make the experience better, etc. In so doing, the store would be able to receive feedback about the working store associates in real or near-real time.

In one embodiment, the application attribution is able to distinguish between customer applications and an actual acquisition by the customer. This enables retailers to ensure appropriate attribution to the associate or the specific location. For example, in one embodiment the application has to be both activated and used to make a purchase prior to attribution of the account to the store or the associate.

Fraud

FIG. 4C is a flow diagram 480 of a fraud risk determination along with the attribution determination in accordance with an embodiment.

With reference now to 485 of FIG. 4C, one embodiment receives an electronic credit application for a new credit account, the application including customer identification information provided by a customer, the customer identification information including a customer's home address.

Referring now to 490 of FIG. 4C, one embodiment receives an application location information 211 related to the electronic credit application for the new credit account, the application location information 211 obtained from a source other than the customer.

With reference now to 491 of FIG. 4C, one embodiment determines a distance between the application location information 211 obtained from the source other than the customer and the customer's home address. In one embodiment, the customer's home address is provided by the customer. In another embodiment, the customer's home address is obtained automatically from a storage on the customer's mobile device, from a different source using some other identifying information (e.g., a phone number, mobile device identifier lookup, search of a different database using some customer identification such as, but not limited to, a customer name, id number (e.g., driver's license, social security, passport, etc.), and the like. Information can be obtained and prefilled in the credit application using customer look-up methods and customer data acquisition from other databases such as described in applications having Ser. Nos. 14/947,803 and 15/244,401 which are incorporated by reference in their entirety herein.

Referring now to 492 of FIG. 4C, one embodiment makes a fraud risk determination based on a result of the determined distance, the fraud risk determination resulting in a lower fraud risk when the determined distance is within a predefined distance, and the fraud risk determination resulting in a higher fraud risk when the determined distance is outside the predefined distance.

With reference now to 493 of FIG. 4C, one embodiment utilizes the fraud risk determination to control at least one aspect of the new credit account. For example, in one embodiment, when the fraud risk determination results in the lower fraud risk, the optional fraud risk evaluator 225 of FIG. 2 does not interfere with the amount of credit available on the new credit account. In contrast, when the fraud risk determination results in the higher fraud risk, the optional fraud risk evaluator 225 of FIG. 2 will reduce the amount of credit available on the new credit account. In one embodiment, the reduction is only for a probationary time period until the fraud risk is deemed to be lower.

In one embodiment, the fraud risk determination results in an extreme fraud risk when the determined distance is outside a second predefined distance, and when the fraud risk determination results in the extreme fraud risk, optional fraud risk evaluator 225 of FIG. 2 will deny the customer from receiving the new credit account.

For example, in one embodiment a customer is applying for a credit account in a state other than their home state, there are a number of applications for different retailers/brands/stores coming from the same address (or same general area depending upon location determination granularity), etc. For example, if a customer applies for credit in a store that is in a different state than the address on record for the customer, this may be a higher fraud indicator.

In another embodiment, it may be that the fraudulent applicant is in the store in a given state but is applying with a stolen identity that is from another state (or another location that is not likely where the stolen identity is presently being utilized).

By automatically determining and providing the store number in conjunction with the customer's application, instead of allowing the customer to input the store number as part of the application process, the opportunity for fraudulent application detection in the Internet-centric mobile application world would be reduced since the store/customer location information is automatically derived by the mobile device, an IP address, etc.

As such, the ability for a customer to fraudulently apply for a plurality of different credit accounts using a plurality of different store identifiers is reduced. That is, since the location information is automatically provided by one of the different devices/methods/systems described herein, the customer will not be able to simply input a fraudulent store identifier or a stolen identity address. This location determination enablement will provide significant cost savings by using methods and systems for fraud analysis that were not necessary, and did not exist, prior to the capability for a customer to utilize the Internet to apply for a credit account. Moreover, the solution is Internet-centric and utilizes location capabilities to solve a problem that necessarily exists in a network-centric environment and specifically in the network-centric environment of credit account application.

In another example of fraud risk evaluation, assume that a store has a number of WiFi nodes. For example, the store had four WiFi nodes, e.g., a node at the front door, a node by the racks, a node at the POS, and a node in the bathroom area. As such, the node identifier would not only identify the store, but the particular WiFi node used by the customer in the store. In one embodiment, if the customer is utilizing the WiFi node in the bathroom, that may raise a fraud risk flag.

Example actions that could occur based on the fraud risk analysis (or generation of the fraud risk flag) could include reducing the amount of available credit on the new credit account or denial of the new credit account completely. For example, during the application process a higher fraud risk flag is raised, based on one or more fraud risk rules that include, but are not limited to, the fraud risk examples provided herein.

Upon indication that a higher fraud risk is possible for the given application, the customer would be asked to turn on access to the location information obtained by their mobile device as part of the application process. If the customer refuses to turn on the access to the mobile device location information, the credit account could be denied, the amount of available credit could be reduced to a minimal amount such as 100.00 dollars, or the like. However, if the customer complies and allows the location information from the mobile device to be provided, the credit account could be approved at a regular or minimized amount. Although 100.00 dollars is described as the reduced amount of available credit, any amount could be the reduced amount. The use of 100.00 dollars herein is merely for purposes of clarity in the given example.

In one embodiment, the associate attribution as described in FIG. 4B can also be used in fraud determination and analysis. For example, in order for a store to meet its goals, an associate could fraudulently complete the needed number of customer credit applications. Even if the associate ensures that every one of the fraudulent credit applications are denied, the fraudulent activity will result in application numbers that will allow the store to receive a bonus, payout, reward, or the like. However, by inserting associate attribution into the application process, the number of denied customer credit applications generated by the identified associate would raise a fraud risk flag.

For example, the optional fraud risk evaluator 225 will access database 227, the database 227 including an associate identifier for each associate of the specific store, and a number of attributions received by each associate. Optional fraud risk evaluator 225 can perform a statistical analysis of the number of attributions received by every associate. If optional fraud risk evaluator 225 determines that one or more of the associates has a statistically higher number of attributions, then optional fraud risk evaluator 225 can generate a fraud risk flag. The fraud risk flag would identify the associate(s) with the statistically higher number of attributions. The identification could result in a review of the associate's data to ensure that no fraud is taking place, that fraud is identified, etc. Moreover, if the review determines that no fraud is occurring, the associate or associates could be recognized as higher achievers, receive additional recognition/reward, be assigned as mentors to other associates, etc.

In another embodiment, a device print scrape (e.g., an IP address from device) fraud routine is specifically utilized for web-centric electronic credit applications. Since the mobile and web can be spoofed by many aspects, it is an important fraud tool that is useful in the wireless application environment.

Referring now to 494 of FIG. 4C, one embodiment uses the application location information 211 to generate an attribution such as described in 430 of FIG. 4A; and/or 465 and 475 of FIG. 4B.

Example Computer System

With reference now to FIG. 5, portions of the technology for providing a communication composed of computer-readable and computer-executable instructions that reside, for example, in non-transitory computer-readable medium (or storage media, etc.) of a computer system. That is, FIG. 5 illustrates one example of a type of computer that can be used to implement embodiments of the present technology. FIG. 5 represents a system or components that may be used in conjunction with aspects of the present technology. In one embodiment, some or all of the components described herein may be combined with some or all of the components of FIG. 5 to practice the present technology.

FIG. 5 illustrates an example computer system 500 used in accordance with embodiments of the present technology. It is appreciated that computer system 500 of FIG. 5 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 5, computer system 500 of FIG. 5 is well adapted to having peripheral computer readable media 502 such as, for example, a disk, a compact disc, a flash drive, and the like coupled thereto.

Computer system 500 of FIG. 5 includes an address/data/control bus 504 for communicating information, and a processor 506A coupled to bus 504 for processing information and instructions. As depicted in FIG. 5, computer system 500 is also well suited to a multi-processor environment in which a plurality of processors 506A, 506B, and 506C are present. Conversely, computer system 500 is also well suited to having a single processor such as, for example, processor 506A. Processors 506A, 506B, and 506C may be any of various types of microprocessors. Computer system 500 also includes data storage features such as a computer usable volatile memory 508, e.g., random access memory (RAM), coupled to bus 504 for storing information and instructions for processors 506A, 506B, and 506C.

Computer system 500 also includes computer usable non-volatile memory 510, e.g., read only memory (ROM), coupled to bus 504 for storing static information and instructions for processors 506A, 506B, and 506C. Also present in computer system 500 is a data storage unit 512 (e.g., a magnetic disk drive, optical disk drive, solid state drive (SSD), and the like) coupled to bus 504 for storing information and instructions. Computer system 500 also can optionally include an alpha-numeric input device 514 including alphanumeric and function keys coupled to bus 504 for communicating information and command selections to processor 506A or processors 506A, 506B, and 506C. Computer system 500 also can optionally include a cursor control device 516 coupled to bus 504 for communicating user input information and command selections to processor 506A or processors 506A, 506B, and 506C. Cursor control device may be a touch sensor, gesture recognition device, and the like. Computer system 500 of the present embodiment can optionally include a display device 518 coupled to bus 504 for displaying information.

Referring still to FIG. 5, display device 518 of FIG. 5 may be a liquid crystal device, cathode ray tube, OLED, plasma display device or other display device suitable for creating graphic images and alpha-numeric characters recognizable to a user. Cursor control device 516 allows the computer user to dynamically signal the movement of a visible symbol (cursor) on a display screen of display device 518. Many implementations of cursor control device 516 are known in the art including a trackball, mouse, touch pad, joystick, non-contact input, gesture recognition, voice commands, bio recognition, and the like. In addition, special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

Computer system 500 is also well suited to having a cursor directed by other means such as, for example, voice commands. Computer system 500 also includes an I/O device 520 for coupling computer system 500 with external entities. For example, in one embodiment, I/O device 520 is a modem for enabling wired or wireless communications between computer system 500 and an external network such as, but not limited to, the Internet or intranet. A more detailed discussion of the present technology is found below.

Referring still to FIG. 5, various other components are depicted for computer system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present technology, for example, is stored as an application 524 or module 526 in memory locations within RAM 508 and memory areas within data storage unit 512. The present technology may be applied to one or more elements of described computer system 500.

Computer system 500 also includes one or more signal generating and receiving device(s) 530 coupled with bus 504 for enabling computer system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one (or more) communication interface 532 for coupling information to and/or from computer system 500.

Communication interface 532 may include a serial port, parallel port, Universal Serial Bus (USB), Ethernet port, Bluetooth, thunderbolt, near field communications port, WiFi, Cellular modem, or other input/output interface. Communication interface 532 may physically, electrically, optically, or wirelessly (e.g., via radio frequency) couple computer system 500 with another device, such as a mobile phone, radio, or computer system.

Computer system 500 is only one example of a suitable computing environment and is not intended to suggest any limitation as to the scope of use or functionality of the present technology. Neither should the computing environment be interpreted as having any dependency or requirement relating to any one or combination of components illustrated in the example computer system 500.

With reference now to FIG. 6, a flow diagram 600 for providing biometric security is shown, according to various embodiments. In general, the security pertains to determining that the customer whose name is on the electronic credit application is actually the customer submitting the electronic credit application. The security described herein, enables authentication of the customer by way of biometrics. Biometrics can include, but are not limited to, thumb print scanning, voice detection, heart rate monitoring, eye/cornea detection, etc.

For example, if biometric security is enacted, or is deemed needed based on a risk factor, or the like, in order for the electronic credit application submitted by the customer to be evaluated (or further evaluated), biometric information will be requested to ensure the customer is properly identified.

In one embodiment, in addition to requiring biometric information, the credit account determiner may also request additional security parameters such as one or more of date, time and location. The additional security parameters may be determined at the moment in which the biometric information is accessed at mobile device 110. Additionally, the security parameters may also be accessed by various features of the mobile device, such as a GPS 118.

For example, when the customer provides the biometric information (e.g., fingerprint) at mobile device 110, the additional security parameters (e.g., date, time, and location) are determined by GPS 118. In particular, in response to the provided biometric information, GPS 118 determines the physical location of the mobile device 110 that includes a time and/or date stamp.

In one embodiment, if the biometric information is approved in combination with one or more of the additional security parameters, then the electronic credit application can be accepted or further evaluated to make a credit account determination.

In one example, the customer may have pre-approved location parameters in order to be authenticated. That is, if a location of the customer (or customer's mobile device) is determined to be within a location parameter, then the electronic credit application is accepted. In the alternative, if a location of the customer is determined to be outside of a location parameter, then the electronic credit application is not accepted. For example, at the time the biometrics are obtained and approved, if the user is within a 50-mile radius of his/her home address (which is the pre-approved location parameter), the user is authenticated, and the electronic credit application is accepted. However, if at the time the biometrics are obtained and approved, the user is outside of the 50-mile radius of his/her home address (which is not a pre-approved location parameter), the user is not authenticated, and the electronic credit application is not accepted.

In one embodiment, pre-approved time and/or date parameters are used to enable user authentication. For example, if a date and/or time at which the biometric information is obtained correspond to a pre-approved time and/or date, then the user is authenticated (if the biometric information is also authenticated) and the electronic credit application is accepted. In one exemplary situation, the customer may have a pre-approved (or expected) time parameter of 9:00 AM to 7:00 PM. If biometric information is obtained in the time frame, then the customer is authenticated, and the electronic credit application is accepted. However, if the biometric information is obtained outside of the time frame, then the customer is not authenticated, and the electronic credit application is not accepted.

At 610, in response to a user initiating access to an electronic credit application executing on the mobile device 110 or executing on a web page being accessed by the user via mobile device 110: biometrics of the user of the mobile device are obtained. For example, the security procedure to authenticate a user includes accessing biometric information (e.g., fingerprint). The biometric information can be captured by mobile device 110 (e.g., scanning of a finger for the fingerprint).

At 620, accessing a physical location of the mobile device. For example, when a user attempts to submit the electronic credit application, the user is authenticated. The security procedure for authentication includes accessing the physical location of the user (which is the physical location of the mobile device assuming that the mobile device is in proximity to the user). In one embodiment, the physical location is determined by GPS 118.

At 630, a time at which the biometrics information is accessed is established. In one embodiment, the procedure also includes establishing a time when the physical location is determined. In one embodiment, a time stamp provided by GPS 118 is used to establish the time.

At 640, a date at which the biometrics are accessed is established. In one embodiment, the time stamp provided by GPS 118 determines the date.

At 650, the security of the electronic credit application submitted by the customer is based on the biometrics of the user, the physical location of the mobile device, the time at which the biometrics were accessed, and the date when the biometrics are accessed. In one embodiment, the date, time and location at which the biometric information is accessed is compared to an approved or expected date, time and location of the user. If the date, time and location are approved and/or expected (as well as approved biometric information), then the user is authenticated.

It is noted that any of the procedures, stated above, regarding flow diagram 600 may be implemented in hardware, or a combination of hardware with firmware and/or software. For example, any of the procedures are implemented by a processor(s) of a cloud environment and/or a computing environment.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A system comprising:
   an electronic application hardware receiver configured to receive, via an Internet connection, an electronic application, the electronic application comprising user identification information provided by a user;
   a location hardware receiver independent of said electronic application hardware receiver configured to receive application location information related to the electronic application, said application location information received separately from said electronic application, the application location information obtained from an electronic device, the application location information not provided by the user, the application location information replacing any application location information provided by the user, the application location information comprising a common identifier to tie said application location information with said electronic application; and
   an attribution determiner configured to:
      utilize said common identifier to correlate said electronic application with said application location information;
      determine a location from said application location information, said location being determined at a time said electronic application was transmitted;
      use the determined location to identify a specific store;
      generate a store attribution for said electronic application for said specific store; and
      update an attribution quota of electronic applications for said specific store with said generated store attribution.

2. The system of claim 1, further comprising:
   said location hardware receiver further to receive the application location information from a location capability of a user's mobile device; and
   said attribution determiner is further to:
      obtain a brand identifier from the electronic application to determine a brand;
      access a database, the database comprising a plurality of store locations for the brand;
      identify a specific store from the plurality of store locations based on the received application location information; and
      provide the store attribution to the specific store.

3. The system of claim 1, further comprising:
   said location hardware receiver further to receive the application location information from a location capability of a user's mobile device; and
   said attribution determiner is further to:
      access a database, the database comprising a plurality of geofenced areas, each of the plurality of geofenced areas comprising associated data;
      utilize the location to identify a specific geofenced area from the plurality of geofenced areas in the database;
      obtain the associated data for the specific geofenced area; and
      utilize a brand identifier associated with the electronic application in conjunction with the associated data for the specific geofenced area to determine a specific store to receive the store attribution.

4. The system of claim 1, further comprising:
   said location hardware receiver further to receive the application location information comprising a node identifier from a user's mobile device, the node identifier identifying a specific node; and
   said attribution determiner is further to:
      obtain a brand identifier from the electronic application;
      access a database, the database comprising a plurality of node identifiers, each of the plurality of node identifiers comprising associated data;
      utilize the brand identifier in conjunction with the node identifier to obtain an associated data for the specific node; and
      determine a specific store to receive the store attribution based on the obtained associated data for the specific node.

5. The system of claim 4, wherein the specific node is selected from the group consisting of: a WiFi node, a beacon, an RFID node, and a mobile phone provider node.

6. The system of claim 1, wherein the application location information is determined at a time the electronic application was initially accessed.

7. The system of claim 1, wherein the application location information is determined at a time the electronic application was received by the user.

8. A system comprising:
   an electronic application hardware receiver configured to receive, via a network, an electronic application, the electronic application comprising:
      a user identification information provided by a user;
      a brand identifier; and
      an associate identification information, the associate identification information comprising an image of at least a portion of an associate;
   a location hardware receiver independent of said electronic application hardware receiver configured to receive application location information related to the electronic application,
      said application location information received separately from said electronic application,
      said application location information derived from a source other than a user's device,
      the application location information obtained from a source other than a user's keyed input,
      the application location information comprising a common identifier to tie said application location information with said electronic application; and
   an attribution determiner configured to:
      utilize said common identifier to correlate said electronic application with said application location information;
      utilize the brand identifier and the application location information to identify a specific store;

access a database, said database comprising associate identifiers for each said associate of said specific store;
utilize said associate identification information to determine a specific associate from said database comprising associate identifiers based on said image;
generate an associate attribution for said electronic application for said specific associate; and
update an attribution quota of electronic applications for said specific associate with said generated associate attribution.

9. The system of claim 8, where said electronic application hardware receiver receives the associate identification information as an attachment to the electronic application; and
processes the associate identification information at a back end separate from a processing of the electronic application.

10. The system of claim 8, wherein the image comprising said portion of said associate is selected from the group consisting of: an image of said associate, an image of a badge worn by said associate, an image of an identification number worn by said associate, and an image of a name tag worn by said associate.

11. The system of claim 8, wherein said attribution determiner is further configured to:
access said database comprising associate identifiers for each associate of the specific store;
provide the associate identifiers for each associate of the specific store to a user's mobile device;
receive an identification of one or more associates from the user's mobile device; and
provide the attribution to the one or more associates.

12. The system of claim 11, wherein said attribution determiner is further configured to:
access a list, the list comprising associates at the specific store at a time included in the application location information; and
provide only the associate identifiers for each of the associates on the list to the user's mobile device.

13. The system of claim 8, wherein said associate identification information is obtained from a store's electronic device via a device-to-device communication between a user's mobile device and the store's electronic device.

14. The system of claim 13, wherein the device-to-device communication further:
triggers a process to initiate the electronic application on the user's mobile device,
the triggered process selected from the group consisting of: a web URL push to the electronic application, a queuing up of the electronic application on a display of the user's mobile device, and an app upload of the electronic application, and
the triggered process receiving access to a cache or a memory store on the user's mobile device to obtain at least a portion of the user identification information and prefill at least a portion of the electronic application with the obtained at least a portion of the user identification information.

15. The system of claim 8, wherein said attribution determiner is further configured to:
perform a statistical analysis of a number of attributions received by every associate;
determine that one or more associates has a statistically higher number of attributions; and
provide a fraud risk flag for the one or more associates having the statistically higher number of attributions.

16. A non-transitory computer-readable medium storing instructions, the instructions comprising:
one or more instructions which, when executed by one or more processors, cause the one or more processors to:
receive at an electronic application hardware receiver an electronic application,
the electronic application comprising user identification information provided by a user,
the user identification information comprising a user's home address;
receive at a location hardware receiver independent of said electronic application hardware receiver application location information related to the electronic application, the application location information derived from a source other than a user's electronic device, said application location information received separately from said electronic application the application location information comprising a common identifier to tie said application location information with said electronic application;
utilize said common identifier to correlate said electronic application with said application location information;
determine a location from said application location information, said location being determined at a time said electronic application was transmitted;
use the determined location to identify a specific store;
generate a store attribution for said electronic application for said specific store;
update an attribution quota of electronic applications for said specific store with said generated store attribution;
receive an associate identification information related to said electronic application, said associate identification information comprising an image comprising at least a portion of an associate, said image provided by a user's mobile device;
access a database, said database comprising associate identifiers for each said associate of said attributed store;
determine a specific associate from said database comprising associate identifiers based on said image;
generate an associate attribution for said electronic application for said specific associate;
update an attribution quota of said electronic applications for said specific associate with said generated associate attribution;
determine a distance between the application location information obtained from the source other than the user and the user's home address; and
make a fraud risk determination based on a result of the determined distance,
the fraud risk determination resulting in a lower fraud risk when the determined distance is within a predefined distance, and
the fraud risk determination resulting in a higher fraud risk when the determined distance is outside the predefined distance.

* * * * *